US012755181B2

(12) United States Patent
Finck et al.

(10) Patent No.: US 12,755,181 B2
(45) Date of Patent: Oct. 6, 2026

(54) SUPPRESSION OF SPECTATOR EFFECTS WITH CAPACITIVELY-SHUNTED FLUX QUBIT COUPLER

(71) Applicant: International Business Machines Corporation, Armonk, NY (US)

(72) Inventors: Aaron Finck, White Plains, NY (US); Muir Kumph, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 485 days.

(21) Appl. No.: 18/493,214

(22) Filed: Oct. 24, 2023

(65) Prior Publication Data

US 2025/0131307 A1 Apr. 24, 2025

(51) Int. Cl.
*G06N 10/40* (2022.01)
*G06N 10/20* (2022.01)

(52) U.S. Cl.
CPC ............. *G06N 10/40* (2022.01); *G06N 10/20* (2022.01)

(58) Field of Classification Search
None
See application file for complete search history.

(56) References Cited

U.S. PATENT DOCUMENTS

| | | | | |
|---|---|---|---|---|
| 10,847,705 | B2 | 11/2020 | Lampert et al. | |
| 11,367,012 | B2 | 6/2022 | Abdo | |
| 11,538,854 | B2 | 12/2022 | Solgun et al. | |
| 11,600,658 | B2 | 3/2023 | Finck et al. | |
| 11,615,336 | B2 | 3/2023 | Oliver et al. | |
| 11,658,660 | B1 | 5/2023 | Finck et al. | |
| 2020/0265334 | A1 | 8/2020 | Haider et al. | |
| 2021/0192380 | A1 | 6/2021 | Jin et al. | |
| 2021/0406746 | A1* | 12/2021 | Stehlik | G06N 10/40 |
| 2021/0408112 | A1* | 12/2021 | Finck | H10N 69/00 |
| 2022/0300844 | A1 | 9/2022 | Stehlik et al. | |
| 2023/0010205 | A1 | 1/2023 | Sank | |
| 2023/0172077 | A1 | 6/2023 | Finck et al. | |
| 2023/0172078 | A1 | 6/2023 | Finck et al. | |

OTHER PUBLICATIONS

Trappen, R. et al. | "Decoherence of a tunable capacitively shunted flux qubit." arXiv:2307.13961v1 [quant-ph] Jul. 26, 2023, 18 pages.
Xu, X. et al. | "ZZ freedom in two qubit gates." arXiv: 2009.00485v2 [quant-ph] Mar. 12, 2021, 13 pages.

(Continued)

*Primary Examiner* — Khaja Ahmad
(74) *Attorney, Agent, or Firm* — Amin, Turocy & Watson, LLP

(57) ABSTRACT

Devices and/or computer-implemented methods facilitating suppression of spectator effects between qubits are provided. In an embodiment, a device can comprise a tunable-coupler qubit (TCQ), wherein a middle pad of the TCQ is coupled to a first capacitively-shunted flux qubit (CSFQ) coupler and wherein outer pads of the TCQ are coupled to a second CSFQ coupler; a first superconducting qubit coupled to the first CSFQ coupler; and a second superconducting qubit coupled to the second CSFQ coupler.

15 Claims, 10 Drawing Sheets

(56) References Cited

OTHER PUBLICATIONS

Heunisch, L. et al. | "Tunable coupler to fully decouple superconducting qubits." arXiv:2306.17007v1 [quant-ph] Jun. 29, 2023, 12 pages.
Ku, J. et al. | "Suppression of Unwanted ZZ Interactions in a Hybrid Two-Qubit System." arXiv:2003.02775v2 [quant- ph] Apr. 9, 2020, 21 pages.
Cai, T.-Q. et al. | "Perturbation impact of spectators on a cross-resonance gate in a tunable coupling superconducting circuit." arXiv:2101.01854v2 [quant-ph] Jan. 28, 2021, 21 pages.
Zajac, D.M. et al. | "Spectator Errors in Tunable Coupling Architectures." arXiv:2108.11221v1 [quant-ph] Aug. 25, 2021, 5 pages.
Stehlik, J. et al. | "Tunable Coupling Architecture for Fixed-frequency Transmons." arXiv:2101.07746v1 [quant-ph] Jan. 19, 2021, 7 pages.
Yan, F. et al. | "A tunable coupling scheme for implementing high-fidelity two-qubit gates." arXiv:1803.09813v1 [quant-ph] Mar. 26, 2018, 10 pages.
Finck, et al., "Mitigating Stray-Coupling via Multi-Junction Qubits," U.S. Appl. No. 17/816,058, filed Jul. 29, 2022.

* cited by examiner

300

500

SUPPRESSION OF SPECTATOR EFFECTS WITH CAPACITIVELY-SHUNTED FLUX QUBIT COUPLER

BACKGROUND

The subject disclosure relates to a quantum device, and more specifically, to a quantum device facilitating suppression of spectator effects with capacitively-shunted flux qubit (CSFQ) couplers.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate suppression of spectator effects with CSFQ couplers are described.

According to an embodiment, a device can comprise a tunable-coupler qubit (TCQ), wherein a middle pad of the TCQ is coupled to a first capacitively-shunted flux qubit (CSFQ) coupler and wherein outer pads of the TCQ are coupled to a second CSFQ coupler; a first superconducting qubit coupled to the first CSFQ coupler; and a second superconducting qubit coupled to the second CSFQ coupler. An advantage of such a device is that the use of CSFQ couplers suppresses any coupling across the TCQ between the couplers.

According to another embodiment, a device can comprise a first TCQ qubit, wherein a middle pad of the first TCQ qubit is coupled to a first CSFQ coupler and a first outer pad of the first TCQ qubit is coupled to a first transmon coupler; a first superconducting qubit coupled to the first transmon coupler; and a second superconducting qubit coupled to the first CSFQ coupler. An advantage of such a device is that the use of CSFQ couplers suppresses any coupling across the TCQ between the couplers.

According to an embodiment, a method can comprise storing quantum information within a first operating mode of a TCQ; enabling ZZ interaction between the TCQ and a transmon qubit via a CSFQ coupler; and executing an entangling gate between the TCQ and the transmon qubit. An advantage of such a method is that the ZZ interaction can be turned on and off and that the use of CSFQ couplers suppresses any coupling across the TCQ between the couplers.

DETAILED DESCRIPTION

Figures 1A, 1B, 1C:
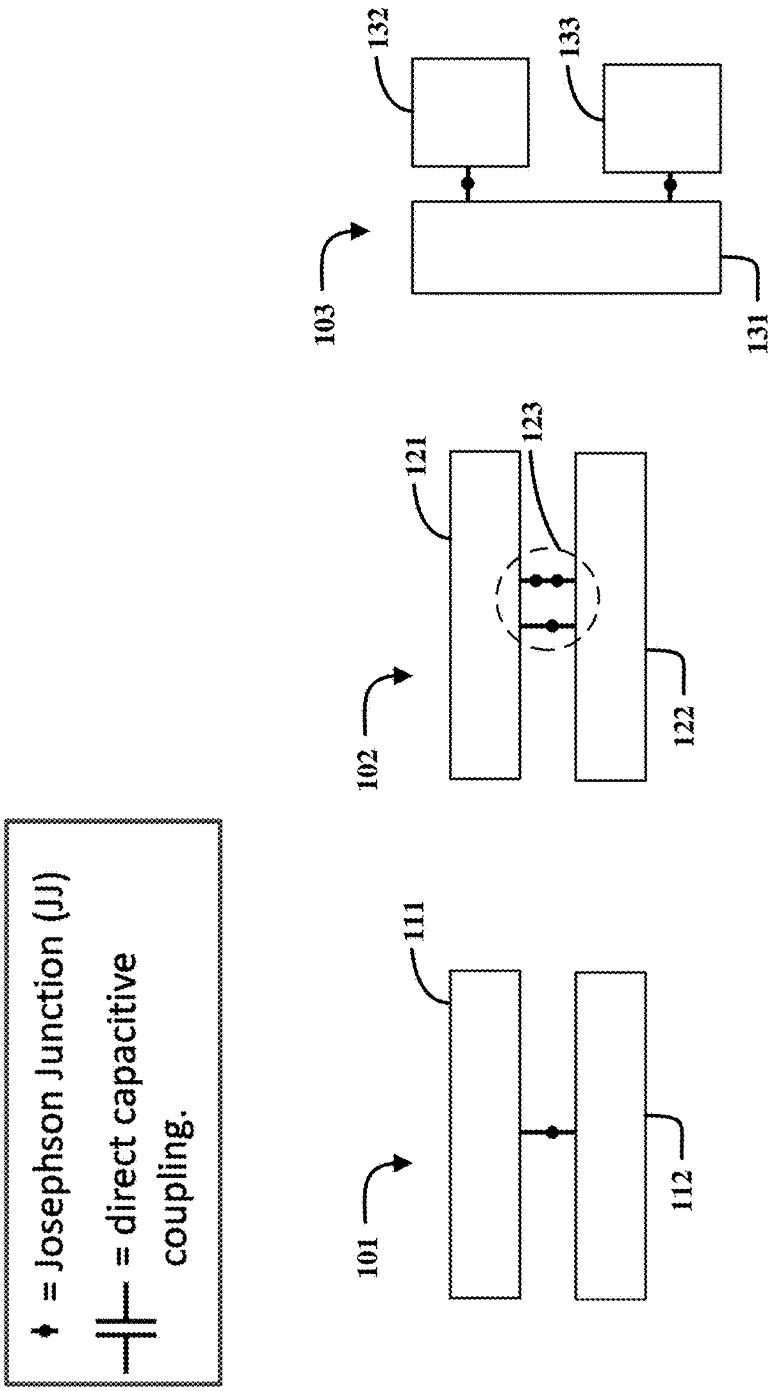
FIG. 1A illustrates an example of a diagram of a transmon qubit in accordance with one or more embodiments described herein.
FIG. 1B illustrates an example of a diagram of a CSFQ coupler in accordance with one or more embodiments described herein.
FIG. 1C illustrates an example of a of a diagram TCQ in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Within quantum computing, flux-tunable couplers are an attractive method to control interactions between neighboring qubits. However, exchange interactions are often only suppressed for certain frequencies and values of applied flux, making such couplers susceptible to perturbations. Additionally, there may be sizable coupling between qubits and non-adjacent couplers. These crosstalk terms can thus lead to a variety of spectator effects in which the state of nearby qubits can inhibit the two-qubit gates between a pair of qubits. For example, given a device comprising three qubits and two flux-tunable couplers, stray exchange coupling between the first qubit and the third qubit (which are not directly coupled) can be as high as 4 MHz. This stray-coupling and associated spectator effects can create quantum errors, thereby decreasing accuracy of quantum computers.

Given the problems described above with prior art technologies, the present disclosure can be implemented to produce a solution to these problems in the form of devices and/or methods that can facilitate suppression of cross-talk between qubits by employing a device comprising a tunable-coupler qubit (TCQ), wherein a middle pad of the TCQ is coupled to a first capacitively-shunted flux qubit (CSFQ) coupler and wherein outer pads of the TCQ are coupled to a second CSFQ coupler; a first superconducting qubit coupled to the first CSFQ coupler; and a second superconducting qubit coupled to the second CSFQ coupler. By utilizing different sets of capacitor pads of the TCQ to couple to the two CSFQ couplers, coupling across the TCQ between the two CSFQ couplers can be suppressed and the next-nearest neighbor coupling can be reduced to less than 35 kHz.

FIG. 1A illustrates an example of a diagram of a transmon qubit 101 as utilized further in latter figures. As shown, transmon qubit 101 comprises a first capacitor pad 111, a second capacitor pad 112, and a Josephson junction between the first capacitor pad 111 and the second capacitor pad 112. FIG. 1B illustrates an example of a diagram of a CSFQ coupler 102 as utilized further in latter figures. As shown, CSFQ coupler 102 comprises a first capacitor pad 121, a second capacitor pad 122, and a SQUID 123 between the first capacitor pad 121 and the second capacitor pad 122. SQUID 123 enables CSFQ coupler 102 be tuned to have positive anharmonicity, as opposed to the negative anharmonicity of transmons. FIG. 1C illustrates an example of a of a diagram TCQ 103 as utilized further in latter figures. As shown, TCQ 103 comprises a middle capacitor pad 131, a first outer capacitor pad 132 and a second outer capacitor pad 133. TCQ 103 is a multi-mode qubit that possesses a low frequency A mode (e.g., a first operating mode) and a high frequency B mode (e.g., a second operating mode).

Figure 2:
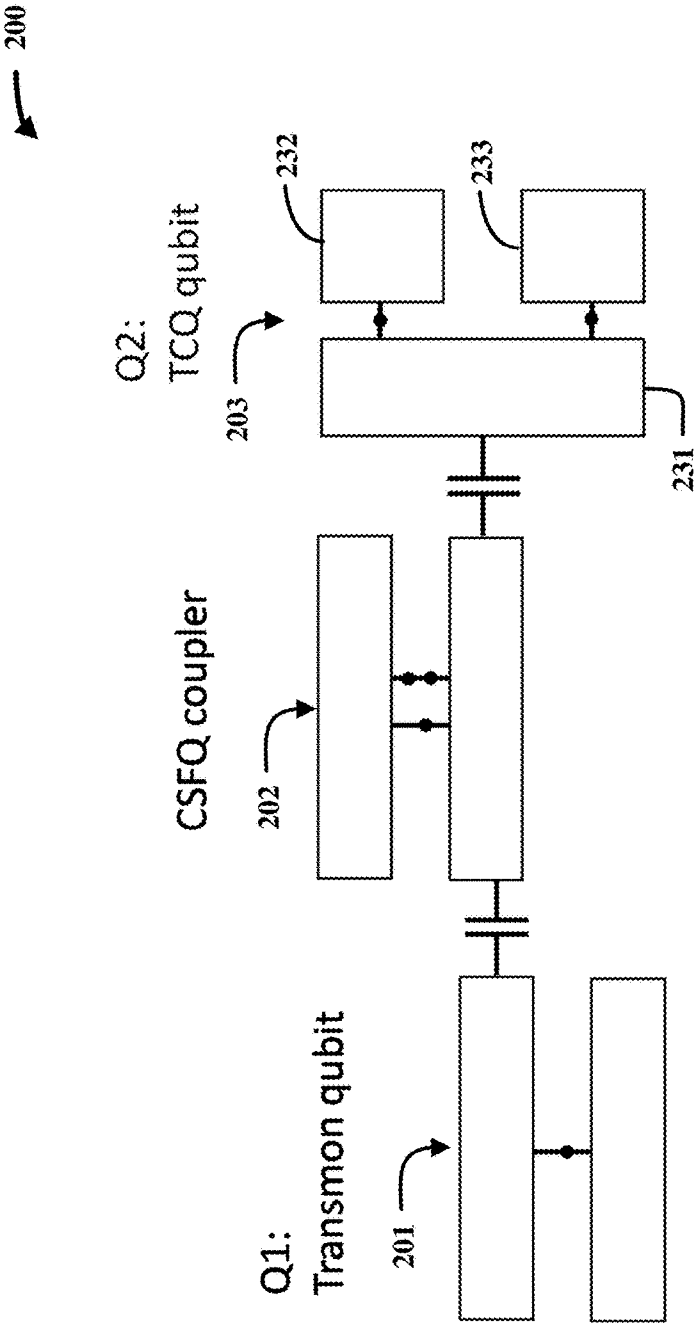
FIG. 2 illustrates a device that facilitates suppression of spectator effects in accordance with one or more embodiments described herein.

FIG. 2 illustrates a device 200 that facilitates suppression of spectator effects in accordance with one or more embodiments described herein.

As shown, device 200 can comprise TCQ 203, wherein middle pad 231 of TCQ 203 is coupled to a CSFQ coupler 202. Device 200 can further comprise transmon qubit 201 coupled to CSFQ coupler 202. In an embodiment, CSFQ 202 can couple transmon 201 and a B (e.g., second) operating mode of TCQ 203. The positive anharmonicity of CSFQ 202 allows one to place its frequency above the frequencies of transmon 201 and TCQ 203 and avoid certain complications for this "bus-above-qubits" configuration. Quantum information can then be stored in the A (e.g., first) operating mode of TCQ 203. This allows for TCQ 203 and transmon 201 to act as data qubits (e.g., qubits that are utilized to store quantum information and perform gates). The A mode of TCQ 203 then has no exchange coupling to either CSFQ 202 or transmon 201, regardless of the flux value of CSFQ 202. However, ZZ interaction between transmon 201 and TCQ 203 can be turned on and off by applying flux to the SQUID of CSFQ 202, allowing for CPHASE entangling gates. For example, CSFQ 202 can comprise a frequency between 6 and 6.5 GHz in the ZZ "off" state, which is below typical readout resonator frequency of above 7 GHz. By changing the flux in the SQUID of CSFQ 202, the frequency of CSFQ 202 will decrease to between 5.6 and 5.2 GHZ, thereby "turning on" ZZ interaction between transmon 201 and TCQ 203. If exchange coupling is desired, then the B mode of TCQ 203 can be activated. It should be appreciated that in one or more embodiments, use of any form of superconducting qubit in place of transmon 201 is envisioned.

Figure 3:
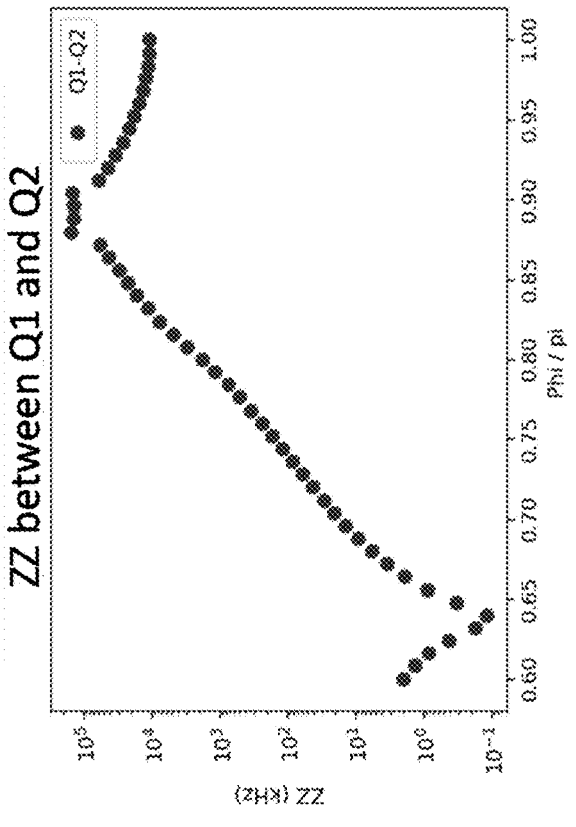
FIG. 3 illustrates a graph illustrating the change in ZZ interaction between a transmon and a TCQ based on a change of flux of a CSFQ in accordance with one or more embodiments described herein.

FIG. 3 illustrates a graph 300 illustrating the change in ZZ interaction between a transmon and a TCQ based on a change of flux of a CSFQ in accordance with one or more embodiments described herein. The y-axis of graph 300 illustrates the amount of ZZ interaction between TCQ 203 and transmon qubit 201 of device 200 and the x-axis of graph 300 illustrates the Phi/pi of CSFQ 202. As utilized herein Phi can be defined as the phase winding imposed by magnetic flux in a CSFQ squid loop. Therefore, as the magnetic flux applied to CSFQ 202 is changed, the Phi is changed as well. As shown by graph 300, when the Phi/pi of CSFQ 202 is approximately 0.65, the ZZ interaction is very low and is in the "off" mode. Similarly, when the Phi/pi of CSFQ 202 is approximately 0.90, the ZZ interaction is large and is in the "on" mode.

Figure 4:
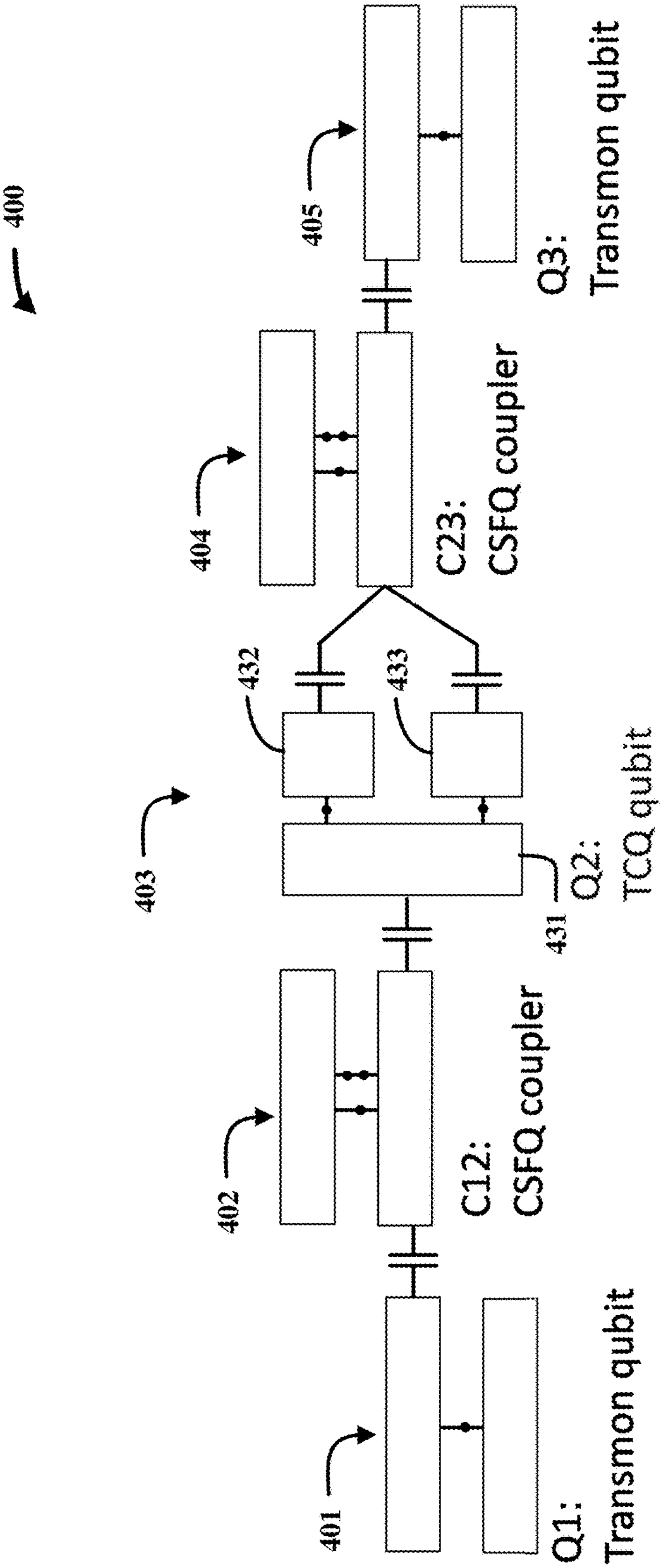
FIG. 4 illustrates a device that facilitates suppression of spectator effects in accordance with one or more embodiments described herein.

FIG. 4 illustrates a device 400 that facilitates suppression of spectator effects in accordance with one or more embodiments described herein.

As shown, device 400 can comprise TCQ 403, wherein middle pad 431 of TCQ 403 is coupled to first CSFQ coupler 402 and wherein outer pads 432 and 433 of TCQ 403 are coupled to second CSFQ coupler 404. Device 400 can further comprise first transmon qubit 401 coupled to first CSFQ coupler 402 and second transmon qubit 405 coupled to second CSFQ coupler 404. It should be appreciated that first transmon qubit 401 and TCQ 403 are coupled to the same pad of first CSFQ coupler 402 and that second transmon qubit 405 and TCQ 403 are coupled to the same pad of second CSFQ coupler 404. Accordingly, by changing the flux applied to CSFQ coupler 402 and CSFQ coupler 404, the ZZ interactions between first transmon qubit 401, TCQ 403 and second transmon qubit 404 can be turned on and off. In an embodiment, first transmon qubit 401 and second transmon qubit 405 can comprise frequencies between 5.2 and 5.7 GHZ.

Figure 5:
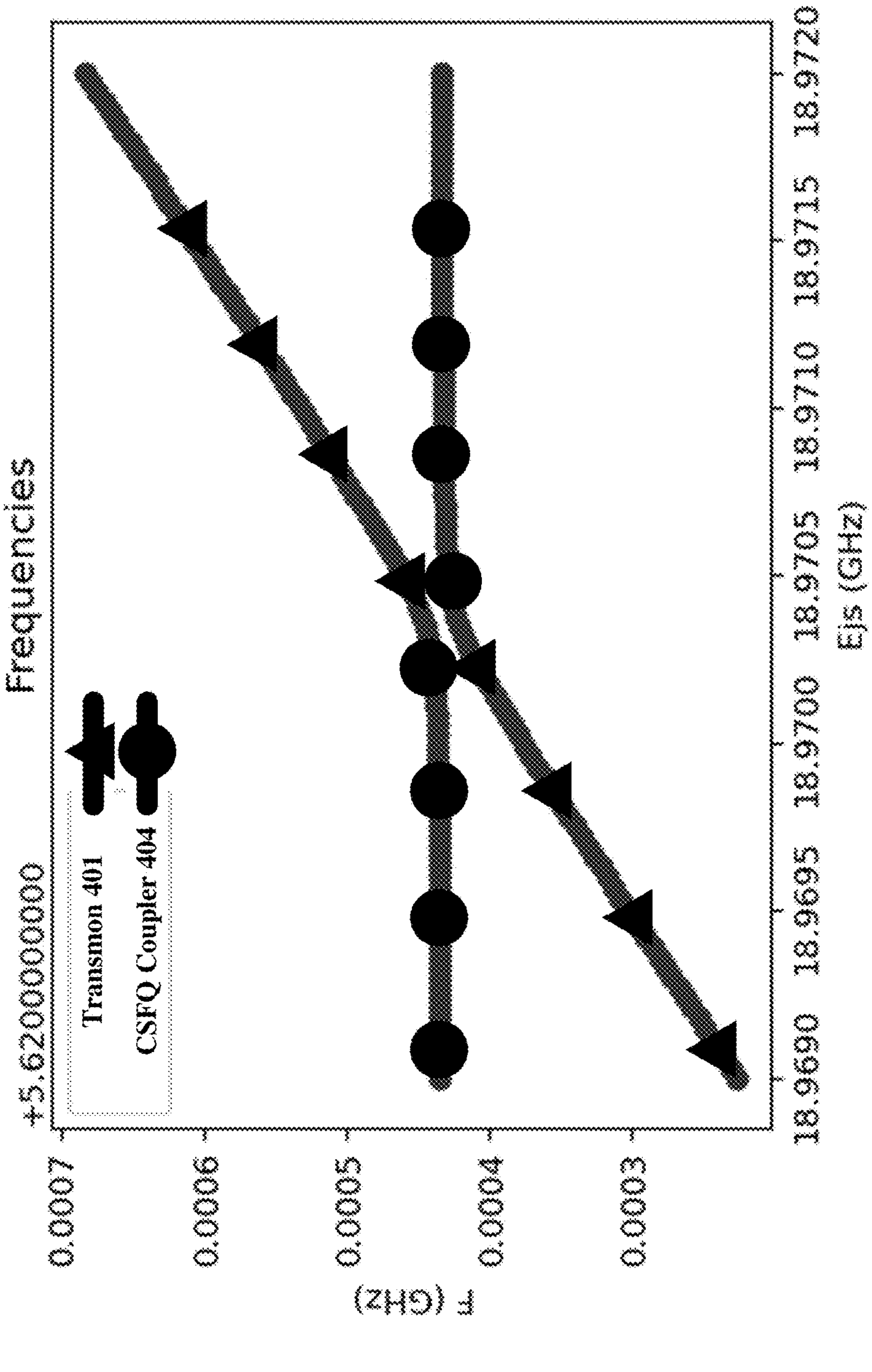
FIG. 5 illustrates a graph showing the stray-coupling between a transmon qubit and a CSFQ coupler of the device illustrated in FIG. 4 in accordance with one or more embodiments described herein.

FIG. 5 illustrates a graph 500 showing the stray-coupling between a transmon qubit and a CSFQ coupler of the device illustrated in FIG. 4 in accordance with one or more embodiments described herein.

In device 400 described above in relation to FIG. 4, there will still be some stray-coupling between first transmon 401 and second CSFQ coupler 404. As shown in graph 500, the stray-coupling between first transmon 401 and second CSFQ coupler 404 is less than 12 kHz, illustrated by the small avoided crossing between the line for first transmon 401 and second CSFQ coupler 404 of graph 500. This small amount of stray-coupling has minimal impact on quantum operations.

Figure 6:
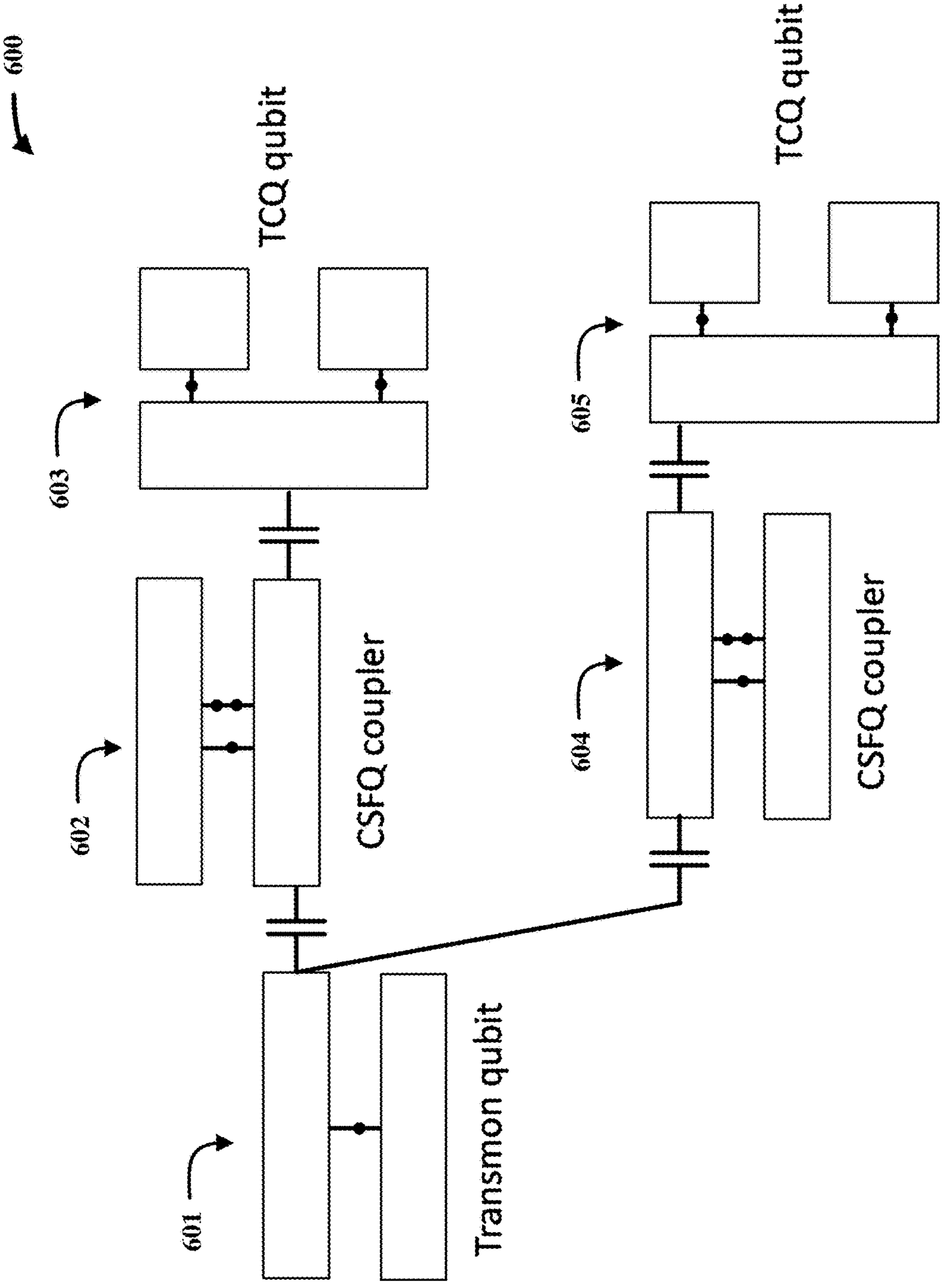
FIG. 6 illustrates a device with two TCQs and two CSFQ couplers in accordance with one or more embodiments described herein.

FIG. 6 illustrates a device 600 with two TCQs and two CSFQ couplers in accordance with one or more embodiments described herein.

As shown, device 600 can comprise TCQ 603, wherein the middle pad of TCQ 603 is coupled to a first CSFQ coupler 602. Device 600 can further comprise transmon qubit 601 coupled to first CSFQ coupler 602 and to second CSFQ coupler 604, wherein second CSFQ coupler 604 is further coupled to the middle pad of second TCQ 605. In an embodiment, first CSFQ 602 can couple transmon 601 and a B (e.g., second) operating mode of TCQ 603 and second CSFQ 604 can couple transmon 601 and a B operating mode of second TCQ 605. The positive anharmonicity of first CSFQ 602 and second CSFQ 604 allows one to place their frequencies above the frequencies of transmon 601, TCQ 603 and second TCQ 605 and avoid certain complications for this "bus-above-qubits" configuration. Quantum information can then be stored in the A (e.g., first) operating mode of TCQ 603 and second TCQ 605. The A mode of TCQ 603 then has no exchange coupling to either CSFQ 602 or transmon 601, regardless of the flux value of CSFQ 602. Similarly, the A mode of second TCQ 605 then has no exchange coupling to either second CSFQ 604 or transmon 601. However, ZZ interaction between transmon 601 and TCQ 603 can be turned on and off by applying flux to the SQUID of first CSFQ 602, allowing for CPHASE entangling gates. Similarly, ZZ interaction between transmon 601 and second TCQ 605 can be turned on and off by applying flux to the SQUID of second CSFQ 604, allowing for CPHASE entangling gates. For example, first CSFQ 602 and second CSFQ 604 can comprise frequencies between 6 and 6.5 GHz in the ZZ "off" state, which is below typical readout resonator frequency of above 7 GHz. By changing the flux in the SQUIDs of first CSFQ 602 and/or second CSFQ 604, the frequency of first CSFQ 602 and/or second CSFQ 604 will decrease to between 5.6 and 5.2 GHz, thereby "turning on" ZZ interaction between transmon 601, TCQ 603 and/or second TCQ 605. If exchange coupling is desired, then the B mode of the desired TCQ can be activated.

Figure 7:
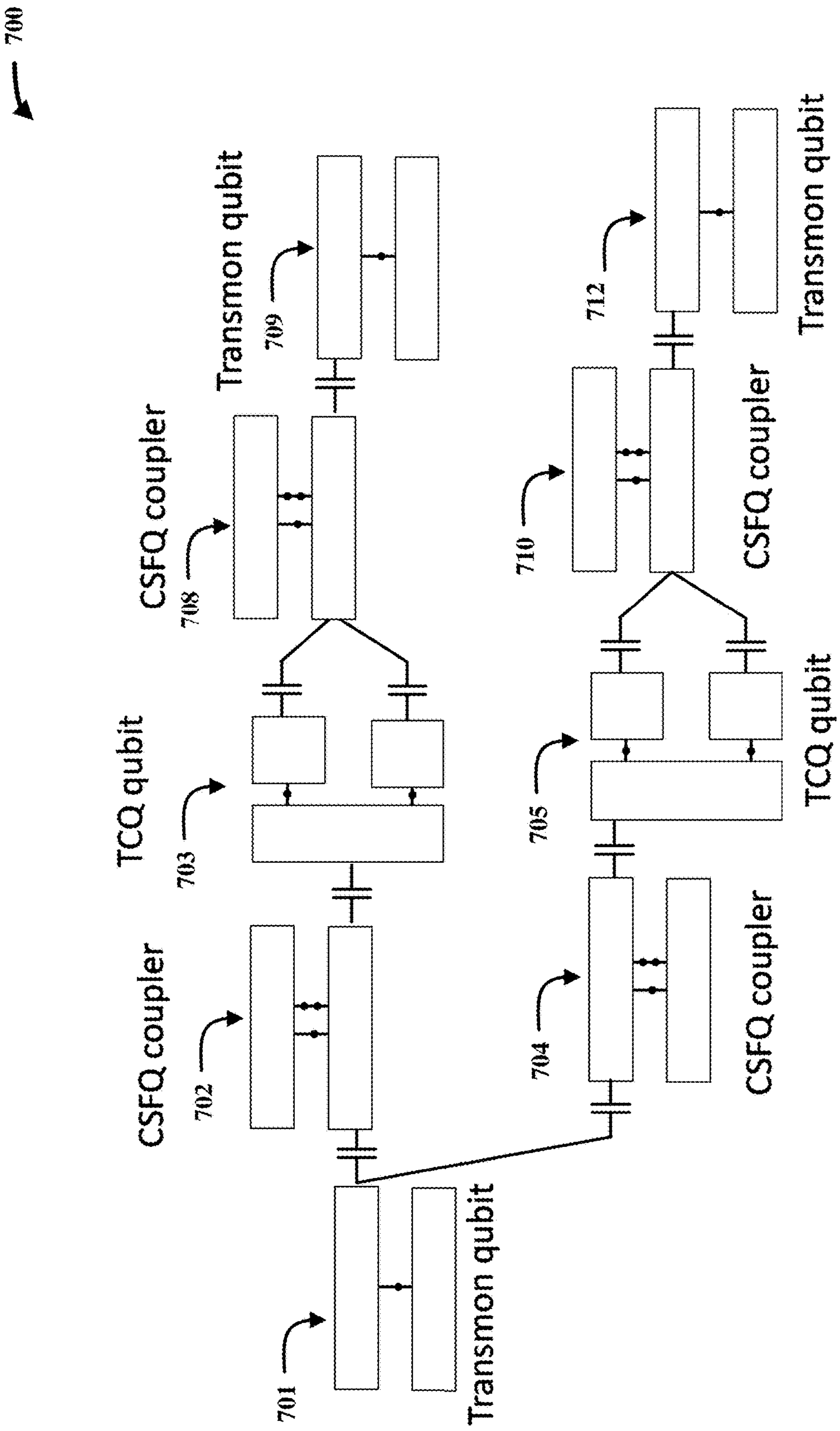
FIG. 7 illustrates a device with multiple CSFQ couplers in accordance with one or more embodiments described herein.

FIG. 7 illustrates a device 700 with multiple CSFQ couplers in accordance with one or more embodiments described herein.

As shown, device 700 can comprise first TCQ 703, wherein the middle pad of first TCQ 703 is coupled to first CSFQ coupler 702 and wherein the outer pads of first TCQ 703 are coupled to second CSFQ coupler 708. Device 400 can further comprise first transmon qubit 701 coupled to first CSFQ coupler 702 and second transmon qubit 709 coupled to second CSFQ coupler 708. First transmon 701 can further be coupled to third CSFQ coupler 704, wherein third CSFQ coupler 704 is further coupled to second TCQ 705. Second TCQ 705 is additionally coupled to fourth CSFQ coupler 710, which is coupled to third transmon 712. As described above in reference to FIGS. 2, 4, and 6, ZZ interaction between the various transmons and TCQs of device 700 can be turned on and off by moderating the amount of flux applied to the SQUIDS of the CSFQ couplers.

Figure 8:
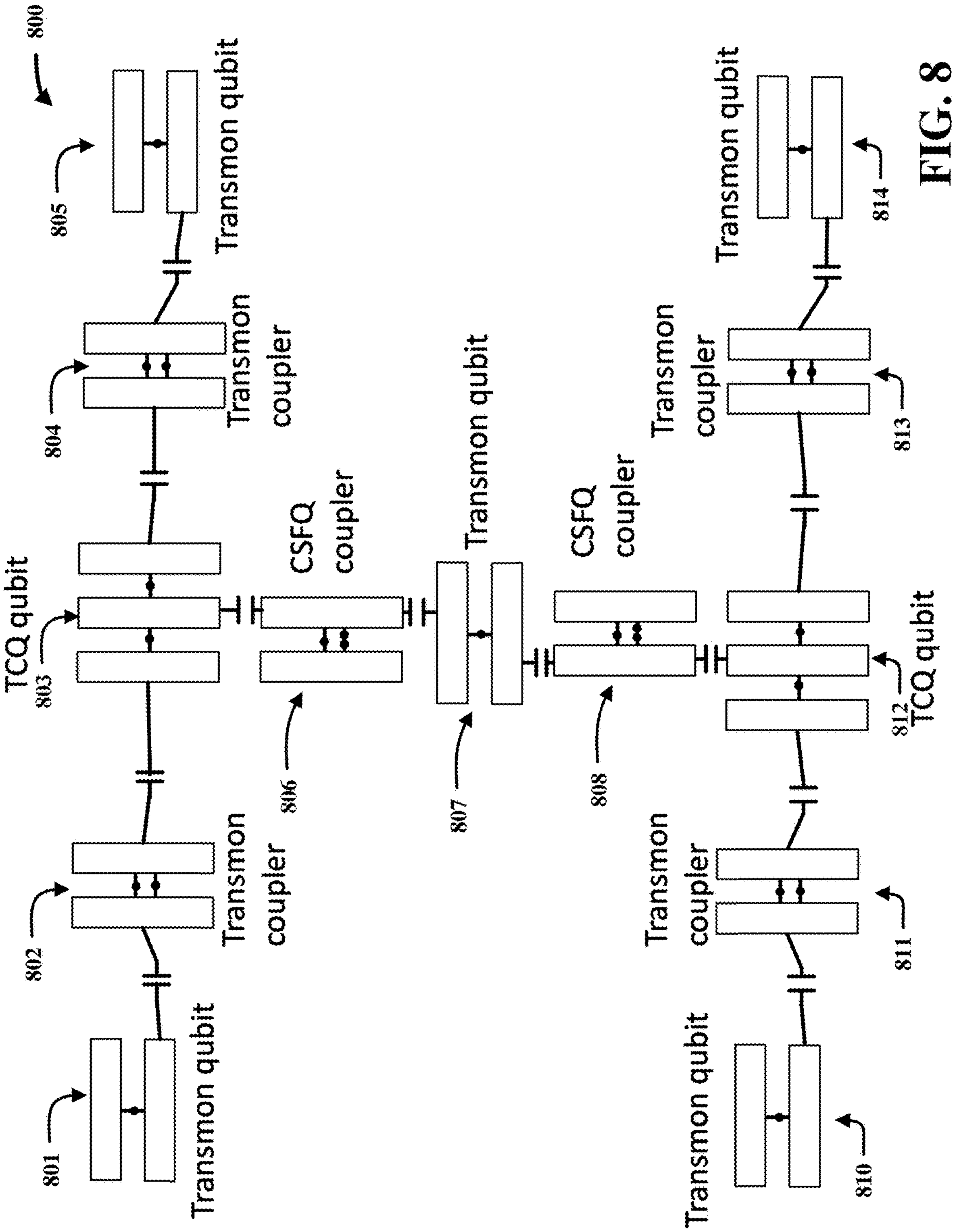
FIG. 8 illustrates a device with multiple CSFQ couplers and transmon couplers in accordance with one or more embodiments described herein.

FIG. 8 illustrates a device with multiple CSFQ couplers and transmon couplers in accordance with one or more embodiments described herein.

As shown device 800 can comprise a first transmon 801 coupled to a first transmon coupler 802, a first TCQ 803 coupled to first transmon coupler 802 and second transmon coupler 804, wherein second transmon coupler 804 is coupled to second transmon 805. A middle pad of first TCQ 803 can be further coupled to first CSFQ coupler 806. Accordingly, only the B mode of TCQ 803 will have exchange coupling with first CSFQ coupler 806. First CSFQ coupler 806 can further be coupled to third transmon 807, which can be coupled to second CSFQ coupler 808. Device 800 can further comprise fourth transmon 810 coupled to third transmon coupler 811, second TCQ 812 coupled to fourth transmon coupler 811 and fifth transmon coupler 813, wherein fifth transmon coupler 813 is coupled to fourth transmon 814. A middle pad of second TCQ 812 can be further coupled to second CSFQ coupler 808. Through the use of transmon couplers, device 800 can comprise additional transmon qubits, thereby increasing the overall number data qubits and the complexity of gates that can be performed by device 800.

The various embodiments of the subject disclosure described herein and/or illustrated in the figures (e.g., devices 200, 400, 600, 700, 800, etc.) can be coupled to one or more external devices (not illustrated in FIGS. 2, 4, 6, 7 and 8) to facilitate operation of such embodiments. For example, with reference to FIG. 2, device 200, transmon 201, TCQ 203 and/or CSFQ coupler 202 can be coupled to one or more external devices that can be external to device 200, such as for instance, a pulse generator device, an electrical power source, and/or a field generator.

In an example embodiment, although not depicted in FIG. 2, device 200, transmon 201, TCQ 203 and/or CSFQ coupler 202 can be coupled to a pulse generator device including, but not limited to, an arbitrary waveform generator (AWG), a vector network analyzer (VNA), and/or another pulse generator device that can be external to device 200 and can transmit and/or receive pulses (e.g., microwave pulses, microwave signals, control signals, etc.) to and/or from device 200, transmon 201, TCQ 203 and/or CSFQ coupler 202. In another example embodiment, although not depicted in FIG. 2, device 200, transmon 201, TCQ 203 and/or CSFQ coupler 202 can be coupled to an electrical power source and/or a magnetic field generator that can be external to device 200 and can provide an electrical current, an electrical potential, and/or a magnetic field to device 200, transmon 201, TCQ 203 and/or CSFQ coupler 202.

In the example embodiments above, such one or more external devices (e.g., a pulse generator device (e.g., an AWG, a VNA, etc.), an electrical power source, and/or a magnetic field generator) can also be coupled to a computer (e.g., computer 1001 described below with reference to FIG. 10) comprising a memory (e.g., volatile memory 1012 and/or persistent storage 1014 described below with reference to FIG. 10) that can store instructions thereon (e.g., software, routines, processing threads, etc.) and a processor (e.g., processor set 1010 described below with reference to FIG. 10) that can execute such instructions that can be stored on the memory. In these example embodiments, such a computer can be employed to operate and/or control (e.g., via processor set 1010 executing instructions stored on volatile memory 1012 and/or persistent storage 1014) such one or more external devices (e.g., a pulse generator device (e.g., an AWG, a VNA, etc.), an electrical power source, and/or a magnetic field generator). For instance, in these example embodiments, such a computer can be employed to enable one or more external devices (e.g., a pulse generator device (e.g., an AWG, a VNA, etc.), an electrical power source, and/or a magnetic field generator) to: a) transmit and/or receive pulses (e.g., microwave pulses, microwave signals, control signals, etc.) to and/or from device 200, transmon 201, TCQ 203 and/or CSFQ coupler 202 and/or b) provide an electrical current, an electrical potential, and/or a magnetic field to device 200, transmon 201, TCQ 203 and/or CSFQ coupler 202.

In various embodiments, an entity that implements devices 200, 400, 600, 700 and/or 800 (e.g., an entity such as, for instance, a human, a computing device, a software application, an agent, a machine learning model, an artificial intelligence model, etc.) can implement one or more of the entangling gate schemes described herein in accordance with one or more embodiments of the subject disclosure. In these embodiments, such an entity can implement one or more of such entangling gate schemes by setting and/or adjusting magnetic flux values applied to SQUIDS of one or more CSFQ such that one or more entangling schemes are achieved. In these embodiments, such an entity can set and/or adjust such one or more magnetic fluxes by applying and/or adjusting (e.g., via one or more of the above defined external devices and/or computer 1001 as described above)

a magnetic field, an electrical current, an electrical potential, and/or a microwave pulse applied to devices 200, 400, 600, 700, and 800 and/or one or more components thereof.

Fabrication of the various embodiments of the subject disclosure described herein and/or illustrated in the figures (e.g., devices 200, 400, 600, 700, and 800, etc.) can comprise multi-step sequences of, for example, photolithographic and/or chemical processing steps that facilitate gradual creation of electronic-based systems, devices, components, and/or circuits in a semiconducting and/or a superconducting device (e.g., an integrated circuit). For instance, the various embodiments of the subject disclosure described herein and/or illustrated in the figures (e.g., devices 200, 400, 600, 700, and 800, etc.) can be fabricated on a substrate (e.g., a silicon (Si) substrate, etc.) by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), chemical vapor deposition (CVD), atomic layer deposition (ALD), physical vapor deposition (PVD), molecular beam epitaxy (MBE), electrochemical deposition (ECD), chemical-mechanical planarization (CMP), backgrinding techniques, and/or another technique for fabricating an integrated circuit.

The various embodiments of the subject disclosure described herein and/or illustrated in the figures (e.g., devices 200, 400, 600, 700, and 800, etc.) can be fabricated using various materials. For example, the various embodiments of the subject disclosure described herein and/or illustrated in the figures (e.g., devices 200, 400, 600, 700, and 800, etc.) can be fabricated using materials of one or more different material classes including, but not limited to: conductive materials, semiconducting materials, superconducting materials, dielectric materials, polymer materials, organic materials, inorganic materials, non-conductive materials, and/or another material that can be utilized with one or more of the techniques described above for fabricating an integrated circuit.

Figure 9:
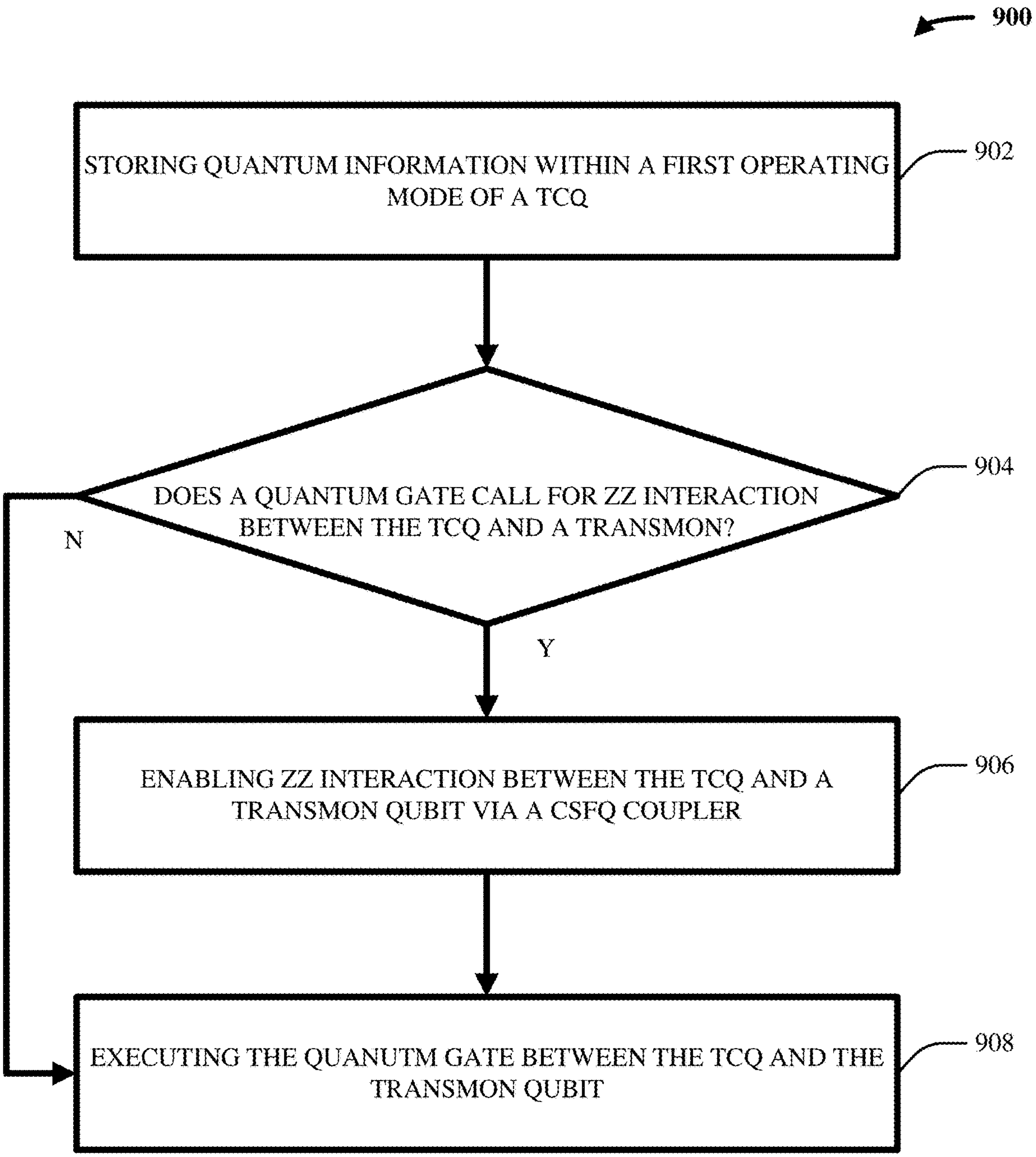
FIG. 9 illustrates a flow diagram of an example, non-limiting computer-implemented method can facilitate performance of quantum gates and suppression of spectator effects between qubits in accordance with one or more embodiments described herein.

FIG. 9 illustrates a flow diagram of an example, non-limiting computer-implemented method 900 can facilitate performance of quantum gates and suppression of spectator effects between qubits in accordance with one or more embodiments described herein.

At 902, method 900 can comprise storing quantum information within a first operating mode (e.g., A mode) of a TCQ (e.g., TCQ 203).

At 904, method 900 can comprise determining whether execution of a quantum gate calls for ZZ interaction between the TCQ (e.g., TCQ 203) and a transmon qubit (e.g., transmon 201). In response to a YES determination, method 900 can proceed to step 906. In response to a NO determination, method 900 can proceed to step 908.

At 906, method 900 can comprise enabling ZZ interaction between the TCQ (e.g., TCQ 203) and the transmon qubit (e.g., transmon 201). For example, as described above in reference to FIGS. 2-8, ZZ interaction between a TCQ and a transmon coupled via a CSFQ coupler can be turned on and off based on the magnetic flux applied to the SQUID of the CSFQ coupler.

At 908, method 900 can comprise executing the quantum gate between the TCQ (e.g., TCQ 203) and the transmon qubit (e.g., transmon 201).

An advantage of such devices described herein is that they enable the suppression of spectator effects between qubits. For example, as described above, by coupling the CSFQ couplers to a second mode of the multimode TCQs, no exchange coupling exists between the CSFQ coupler and the first mode. As no exchange coupling exists, spectator effects are thereby suppressed. Further, the use of the CSFQ coupler enables ZZ interaction to be turned on and off, enabling the performance of entangling gates while still suppressing unwanted spectator effects, thereby improving quantum performance.

Figure 10:
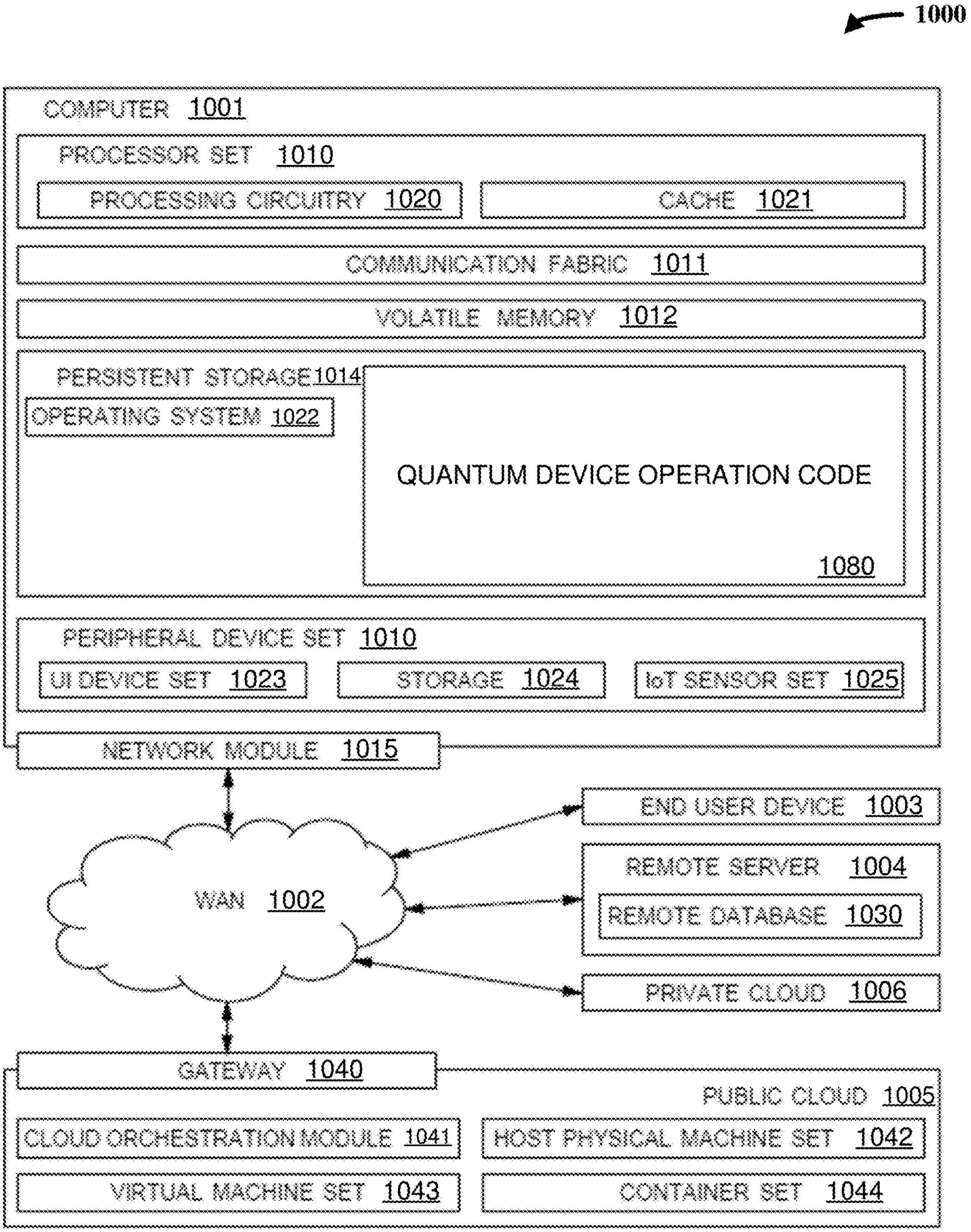
FIG. 10 illustrates an example, non-limiting environment for the execution of at least some of the computer code in accordance with one or more embodiments described herein.

FIG. 10 and the following discussion are intended to provide a brief, general description of a suitable computing environment 1000 in which one or more embodiments described herein at FIG. 9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the quantum device operation code 1080. In addition to block 1080, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1080, as identified above), peripheral device set 1014 (including user interface (UI), device set 1023, storage 1024, and Internet of Things (IOT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method can be distributed among multiple computers and/or between multiple locations. On the other hand, in this presentation of computing environment 1000, detailed discussion is focused on a single computer, specifically computer 1001, to keep the presentation as simple as possible. Computer 1001 can be located in a cloud, even though it is not shown in a cloud in FIG. 10. On the other hand, computer 1001 is not required to be in a cloud except to any extent as can be affirmatively indicated.

PROCESSOR SET 1010 includes one, or more, computer processors of any type now known or to be developed in the future. Processing circuitry 1020 can be distributed over multiple packages, for example, multiple, coordinated integrated circuit chips. Processing circuitry 1020 can implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set can be located "off chip." In some computing environments, processor set 1010 can be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods can be stored in block 1080 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory can be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 can be a read only memory (ROM), but typically at least a portion of the persistent storage allows writing of data, deletion of data and re-writing of data. Some familiar forms of persistent storage include magnetic disks and solid-state storage devices. Operating system 1022 can take several forms, such as various known proprietary operating systems or open-source Portable Operating System Interface type operating systems that employ a kernel. The code included in block 1080 typically includes at least some of the computer code involved in performing the inventive methods.

PERIPHERAL DEVICE SET 1014 includes the set of peripheral devices of computer 1001. Data communication connections between the peripheral devices and the other components of computer 1001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 can include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 can be persistent and/or volatile. In some embodiments, storage 1024 can take the form of a quantum computing storage device for storing data in the form of qubits. In embodiments where computer 1001 is required to have a large amount of storage (for example, where computer 1001 locally stores and manages a large database) then this storage can be provided by peripheral storage devices designed for storing large amounts of data, such as a storage area network (SAN) that is shared by multiple, geographically distributed computers. IoT sensor set 1025 is made up of sensors that can be used in Internet of Things applications. For example, one sensor can be a thermometer and another sensor can be a motion detector.

NETWORK MODULE 1015 is the collection of computer software, hardware, and firmware that allows computer 1001 to communicate with other computers through WAN 1002. Network module 1015 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and can take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 can be a client device, such as thin client, heavy client, mainframe computer and/or desktop computer.

REMOTE SERVER 1004 is any computer system that serves at least some data and/or functionality to computer 1001. Remote server 1004 can be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data can be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs can be stored as images and can be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware and firmware allowing public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer-implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A device comprising:

a tunable-coupler qubit (TCQ), wherein a middle pad of the TCQ is coupled to a first capacitively-shunted flux qubit (CSFQ) coupler and wherein outer pads of the TCQ are coupled to a second CSFQ coupler;

a first superconducting qubit coupled to the first CSFQ coupler; and a second superconducting qubit coupled to the second CSFQ coupler.

2. The device of claim 1, wherein the middle pad of the TCQ is coupled to a first pad of the first CSFQ coupler and the first superconducting qubit is coupled to the first pad of the first CSFQ coupler.

3. The device of claim 1, wherein the outer pads of the of the TCQ are coupled to a first pad of the second CSFQ coupler and the second superconducting qubit is coupled to the first pad of the second CSFQ coupler.

4. The device of claim 1, wherein the TCQ comprises a first operating mode and a second operating mode.

5. The device of claim 4, wherein the first operating mode of the TCQ enables storage of quantum information and wherein the second operating mode enables transfer of quantum information between the TCQ and one of the superconducting qubits via the first CSFQ coupler or the second CSFQ coupler.

6. The device of claim 5, wherein the first operating mode comprises a frequency between about 4.4 and 4.6 GHz and the second operating mode comprises a frequency between about 4.9 and 5.1 GHz.

7. The device of claim 1, further comprising:

a third CSFQ coupled to the first superconducting qubit; and a second tunable-coupler qubit comprising a middle pad coupled to the third CSFQ.

8. The device of claim 7, further comprising:

a fourth CSFQ coupled to outer pads of the second TCQ qubit; and a third superconducting qubit coupled to the fourth CSFQ.

9. A device comprising:

a first TCQ qubit, wherein a middle pad of the first TCQ qubit is coupled to a first CSFQ coupler and a first outer pad of the first TCQ qubit is coupled to a first transmon coupler;

a first superconducting qubit coupled to the first transmon coupler; and a second superconducting qubit coupled to the first CSFQ coupler.

10. The device of claim 9, further comprising:

a second CSFQ coupler coupled to the second superconducting qubit; and a second TCQ qubit, wherein a middle pad of the second TCQ qubit is coupled to the second CSFQ coupler.

11. The device of claim 10, further comprising:

a second transmon coupler coupled to a second outer pad of the first TCQ qubit; and a third superconducting qubit coupled to the second transmon coupler.

12. The device of claim 11, further comprising:

a third transmon coupler coupled to a first outer pad of the second TCQ qubit; and a fourth transmon coupler coupled to a second outer pad of the second TCQ qubit.

13. The device of claim 12, further comprising:

a fourth superconducting qubit coupled to the third transmon coupler; and a fifth superconducting qubit coupled to the fourth transmon coupler.

14. The device of claim 10, wherein the first TCQ qubit and the second TCQ qubit comprise a first operating mode and a second operating mode.

15. The device of claim 14, wherein the first operating mode comprises a frequency between 4.4 and 4.6 GHz and the second operating mode comprises a frequency between 4.9 and 5.1 GHz.

* * * * *